United States Patent
Meier (10) Patent No.: US 8,238,925 B2
(45) Date of Patent: Aug. 7, 2012

(54) HYBRID QOS ACCESS METHOD FOR POWER SAVE STATIONS

(75) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 978 days.

(21) Appl. No.: 11/328,363

(22) Filed: Jan. 9, 2006

(65) Prior Publication Data
US 2007/0160003 A1    Jul. 12, 2007

(51) Int. Cl.
*H04Q 7/20*    (2006.01)
(52) U.S. Cl. .............. 455/451; 455/450; 455/452.1; 455/452.2; 455/453; 455/509; 455/13.4; 455/464
(58) Field of Classification Search ............ 455/453, 455/451
See application file for complete search history.

(56) References Cited

U.S. PATENT DOCUMENTS

| | | | |
|---|---|---|---|
| 5,896,561 A * | 4/1999 | Schrader et al. ........... 455/67.11 |
| 2004/0003107 A1 | 1/2004 | Barham et al. |
| 2004/0266351 A1 | 12/2004 | Chuah et al. |
| 2005/0009578 A1 * | 1/2005 | Liu ................................ 455/574 |
| 2005/0018624 A1 * | 1/2005 | Meier et al. ................... 370/318 |
| 2005/0047357 A1 * | 3/2005 | Benveniste ................... 370/311 |
| 2005/0227624 A1 | 10/2005 | Hiddink et al. |
| 2006/0121928 A1 * | 6/2006 | Itsuki ............................ 455/522 |
| 2007/0143637 A1 * | 6/2007 | Tsai .............................. 713/300 |

OTHER PUBLICATIONS

Qiang Ni, "A Survey of QoS Enhancement for IEEE 802.11 Wireless Lan", 2004.*

* cited by examiner

*Primary Examiner* — Charles Appiah
*Assistant Examiner* — Randy Peaches
(74) *Attorney, Agent, or Firm* — Tucker Ellis LLP (57) ABSTRACT

A hybrid QoS access method for a wireless station, such as a power-save VoIP station, where a first method, such as "reverse polling" is used on a lightly loaded channel and a second method, e.g. unscheduled polled access, is used to mitigate contention when the channel is becomes more heavily loaded.

14 Claims, 7 Drawing Sheets

HYBRID QOS ACCESS METHOD FOR POWER SAVE STATIONS

BACKGROUND OF THE INVENTION

The present invention relates generally to a system and method to facilitate power saving for a wireless station.

The Institute of Electrical and Electronic Engineers (IEEE) 802.11e draft standard defines two access methods for Quality of Service (QoS) streams, EDCA (Enhanced Distributed Channel Access) and HCCA (Hybrid Controlled Channel Access).

EDCA channel access is contention based. EDCA channel access parameters are prioritized so that channel access delay is statistically decreased for high priority streams. On lightly loaded channels, EDCA minimizes channel latency; however, EDCA is susceptible to congestion as the traffic load increases, especially in networks with hidden nodes. Herein, a first wireless station is "hidden" from a second wireless station if the second wireless station cannot detect transmissions by the first wireless stations; however, simultaneous transmissions by the wireless stations will collide at a receiver (e.g. a common parent access point).

An AP (access point) may use the highly-prioritized "contention-controlled" HCCA access method to gain control of the channel. HCCA utilizes polling by a parent AP to grant channel access to child stations. HCCA is much less susceptible to collisions caused by hidden nodes since an AP is never hidden from its child stations. HCCA provides more deterministic access for QoS streams; however, HCCA adds latency because frames are only sent at scheduled polling times. An AP (access point) initiates a bi-direcitonal HCCA burst with a station by sending a data+poll frame to the station. An AP can only send a data+poll frame to the power-save HCCA station at the start of each scheduled wakeup time. The power-save station sends uplink frames in a scheduled wakeup period in response to a downlink poll frame.

An access method developed for power-save VoIP (Voice over Internet Protocol) stations is commonly referred to as "reverse polling." Reverse polling is based on EDCA channel access and the 802.11e "Unscheduled Advanced Power-Save Delivery" (U-APSD) method. With reverse polling, frame exchanges between a power-save wireless station and a parent AP are always initiated by the wireless station. A U-APSD power-save VoIP station wakes up whenever it has a voice sample ready for transmission and sends an uplink voice frame to the AP. The uplink frame establishes an unscheduled wakeup period for the station. The AP then delivers downlink frames to the client during the unscheduled wakeup period. Reverse polling minimizes latency for the uplink stream, but is susceptible to congestion since it is EDCA based. If silence suppression is enabled, reverse polling also adds to the channel load because a U-APSD VoIP station generates "null" uplink frames to establish unscheduled wakeup periods during periods of uplink silence suppression.

In the IEEE 802.11e QoS standard, both HCCA and EDCA access cannot be used for the same QoS stream.

BRIEF SUMMARY OF THE INVENTION

In accordance with an aspect of the present invention, there is described herein system and method that utilizes different channel access methods for different channel conditions. An aspect of the present invention contemplates a hybrid QoS method for power-save stations, such as power-save VoIP stations, that uses reverse polling on a lightly loaded channel, and uses unscheduled polled access to mitigate contention when the channel becomes more heavily loaded.

As used herein, a channel is considered as "heavily loaded" if quality-of-service (QoS) is noticeably affected by collisions and channel access delays and, otherwise, as "lightly loaded". It should be noted that collision rates and channel access delays may vary greatly within the coverage area of a single access point. For example, a contention based channel can be considered heavily loaded if the total collision time approaches or exceeds the total back-off time.

In accordance with an aspect of the present invention, there is described herein a method for performing channel access. The method comprises determining a load for the channel and operating in a power-save mode responsive to determining the load is less than a predetermined threshold. The method further comprises operating in an active mode, responsive to determining the load is greater than the predetermined threshold. An access point centrally coordinates access to the channel, for stations operating in active mode, so that the channel load, channel access delays and collisions are reduced.

In accordance with an aspect of the present invention, there is described herein an apparatus comprising a wireless transceiver and power-save logic operatively coupled to the wireless transceiver. The power-save logic is configured to determine a load for a channel the wireless transceiver is operating. The power-save logic is responsive to operating the wireless transceiver in a power-save mode responsive to determining the load is less than a predetermined threshold, and to operating the wireless transceiver in an active mode responsive to determining the load is greater than the predetermined threshold.

In accordance with an aspect of the present invention, there is described herein a wireless transceiver comprising means adapted for determining a load for a channel. The wireless transceiver further comprises means adapted for operating in a power-save mode responsive to determining the load is less than a predetermined threshold and means adapted for operating in an active mode responsive to determining the load is greater than the predetermined threshold.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention.

Figure 4:
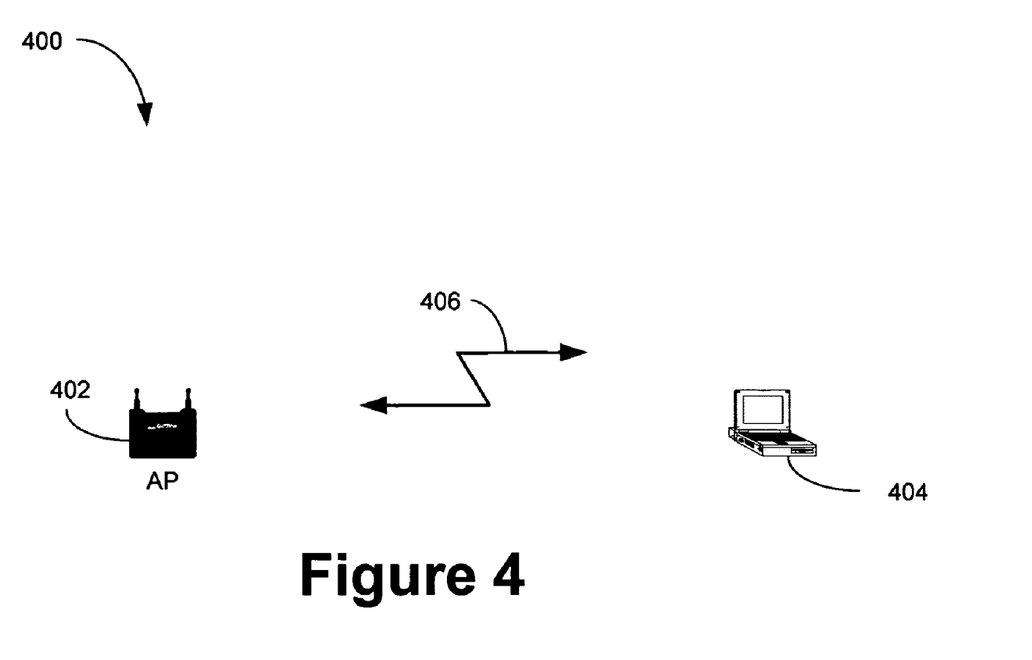
FIG. 4 is a block diagram of a wireless network.

An aspect of the present invention is to implement a hybrid QoS access method for a wireless station, such as a VoIP station with isochronous uplink and downlink voice streams. Referring to FIG. 4, there is illustrated a wireless network 400 adapted to implement the hybrid QoS access method in accordance with an aspect of the present invention. AP 402 communicates with wireless (power-save) station 404 via a wireless communication channel 406. As described herein in a preferred embodiment, wireless station 404 is a Power-save VoIP station; however, those skilled in the art can readily appreciate that aspects of the present invention are suitably adaptable to any power-save wireless station. Thus, aspects of the present invention should not be construed as to be limited to only power-save VoIP stations. In the example illustrated in FIG. 4, wireless station 404 is configured to operate in a power-save mode when the load on wireless channel 404 is light and configured to operate in an active mode when the load on wireless channel 404 is heavy.

In accordance with an aspect of the present invention, wireless station 404 and AP 402 negotiate their hybrid QoS access capability. Power-save station 404 can determine the current channel load on channel 406 by a variety of techniques that are known in the art (see for example U.S. Patent Application Publications 2004/0003107, 2004/0266351 and 2005/0227624). AP 402 can advertise loading information in Beacon and Probe Response messages. Optionally, AP 402 can indicate that stations (e.g. station 404 using the hybrid access method must operate in the active mode via a flag contained in periodic Beacon messages. Wireless station 404 can independently determine channel load, by measuring transmit delays of frames sent by the station, and independently transition between power-save and active mode. Furthermore, a combination of techniques can be employed for monitoring channel load. For example, wireless station 404 can be required to monitor beacon frames when associated with AP 402 that advertises channel load via beacon frames, while independently measuring transmit delays.

Wireless station 404 operates in a power-save mode when channel 406 is lightly loaded, or loaded below a predetermined threshold. For example, wireless station 404 can operate in the 802.11e U-APSD power-save mode when the channel is lightly loaded. A standard 802.11 station indicates to its parent AP (e.g. AP 402) that it is operating in a power-save mode or active mode by setting a flag in any uplink frame sent by the station.

Wireless station 404 operates in an active mode if the channel load exceeds a predetermined threshold value. If AP 402 indicates that the channel is heavily loaded, then all participating power-save stations (e.g. VoIP stations with active calls), such as station 404, operate in the active mode. Wireless station 404 may independently transition to the active mode if it determines that the channel is busy (heavily loaded) by measuring its own transmit delays. Note that the channel may be is heavily loaded at wireless station 404 even though the overall channel load, in the coverage area of the AP, may be relatively low.

On a lightly loaded channel, a VoIP power-save station uses a first method such as EDCA/U-APSD based "reverse polling" to send and receive voice frames. For example, wireless station 404 wakes up whenever a voice sample is ready for transmission and uses EDCA access to send one or more uplink frames to AP 402. AP 402 then sends downlink frames to wireless station 404 during the unscheduled wakeup period established by the uplink frames.

For VoIP, AP 402 uses highest priority HCCA channel access to send a downlink voice frame from an admitted voice stream to wireless station 404, whether wireless station 404 is operating in active mode or in a power-save mode such as U-APSD power-save mode. AP 402 piggybacks a poll frame on a downlink voice frame sent to a VoIP station. HCCA channel access is relatively contention-free. Only an AP may gain access to the channel via HCCA.

If a VoIP station, such as wireless station 404, is operating in an active mode, then AP 402 immediately sends downlink data+poll frames to the VoIP station as frames arrive. Wireless station 404 immediately responds to a downlink data+poll frame with either an uplink data+ACK frame or an ACK frame without performing the channel access algorithm (i.e. even if random backoff is in effect for the uplink data frame). Therefore, periodic HCCA based downlink data+poll voice transmissions by AP 402 mitigate contention for uplink voice transmissions from wireless station 404.

AP 402 allocates a single "strict priority" HCCA transmit queue which is reserved for admitted downlink voice streams. The strict priority queue is serviced first before other queues, such as EDCA transmit queues. Admission control can be utilized to limit the traffic in the strict priority HCCA transmit queue so that other EDCA transmit queues are not starved.

Ideally, when wireless station 404 is an active station it should not contribute to the congestion on channel 406, when the channel is heavily loaded, by using EDCA access for uplink voice transmissions. If the hybrid QoS access method described herein is in effect, then wireless station 404 is guaranteed to receive periodic polls from AP 402. This aspect ensures that a VoIP station is guaranteed to receive periodic polls from its parent AP if a) it has an active voice call, b) silence suppression is disabled for the downlink stream, and c) the AP has determined that the station is in active mode. A station can refrain from using EDCA access for uplink transmissions if it is guaranteed to receive periodic polls from the AP and the channel is heavily loaded.

Figure 2:
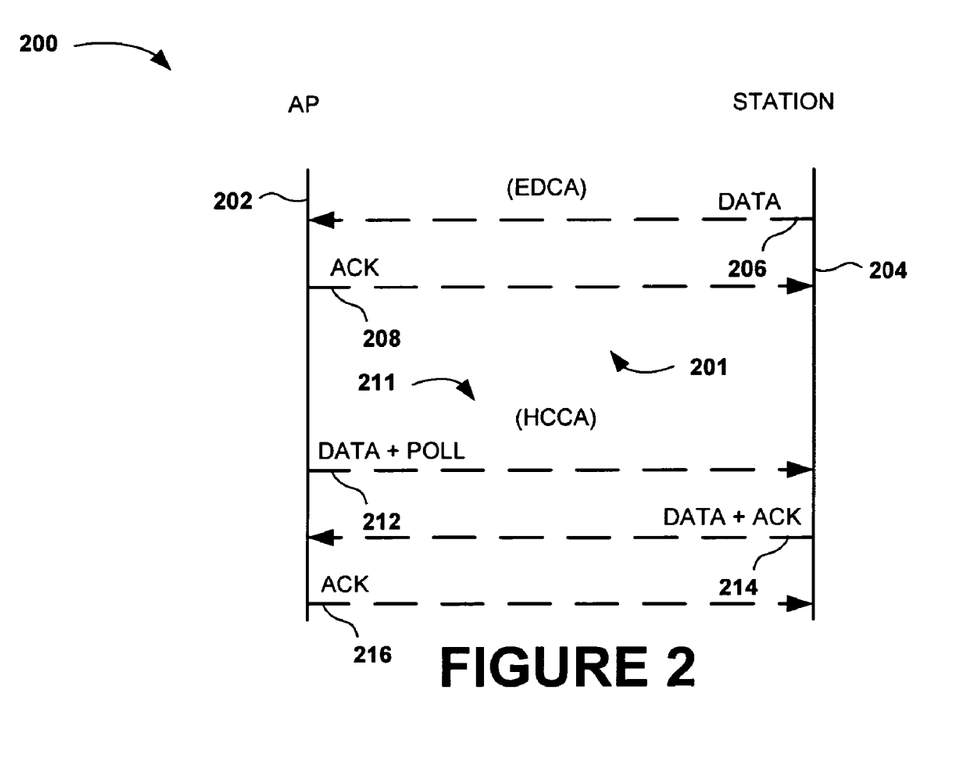
FIG. 2 is a signal diagram for a lightly loaded channel.
Figure 3:
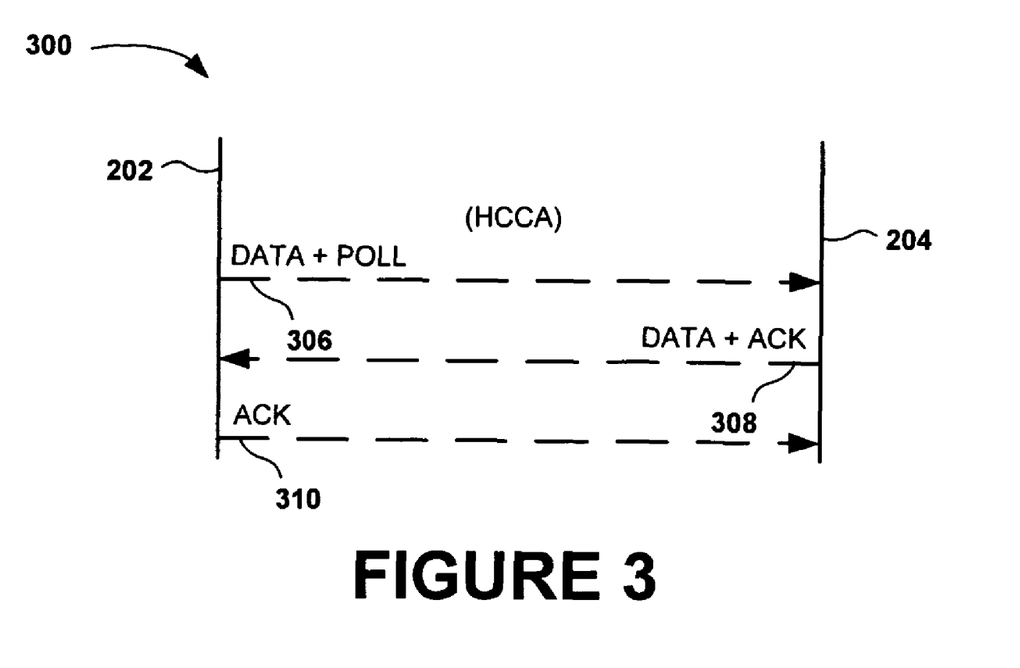
FIG. 3 is a signal diagram for a heavily loaded channel.

An advantage of the hybrid method is that it is very simple and does not require a polling scheduler. Latency is minimized and power saving is maximized when the channel is lightly loaded. Latency created by channel contention is mitigated when the channel is heavily loaded. The downlink latency incurred by a periodic wakeup schedule is eliminated because an AP can immediately send a downlink data+poll frame to an active station, when the data frame arrives, rather than waiting until the next wakeup period. Traffic and access overhead are reduced when the channel is heavily loaded so that the maximum number of active VoIP calls per AP is generally the same as for a full (much more complex) HCCA implementation. FIGS. 2 and 3 illustrate how traffic and access overhead are reduced. FIG. 2 illustrates the channel accesses and frame exchanges required to send one uplink voice frame and one downlink voice frame with the U-APSD power-save mechanism and EDCA channel access. FIG. 3 illustrates the channel access and frame exchanges required to send one uplink voice frame and one downlink voice frame with HCCA channel access. In FIG. 3, the number of channel accesses is reduced from two to one and the number of frames is reduced from four to three. FIG. 2 and FIG. 3 illustrate the required channel accesses and frame exchanges, in the absence of collisions. A data frame is typically retransmitted if it collides with another transmission. EDCA is much more susceptible to collisions than HCCA. On heavily-loaded channels HCCA can greatly reduce the channel access overhead and frame retransmissions caused by collisions.

Figure 1:
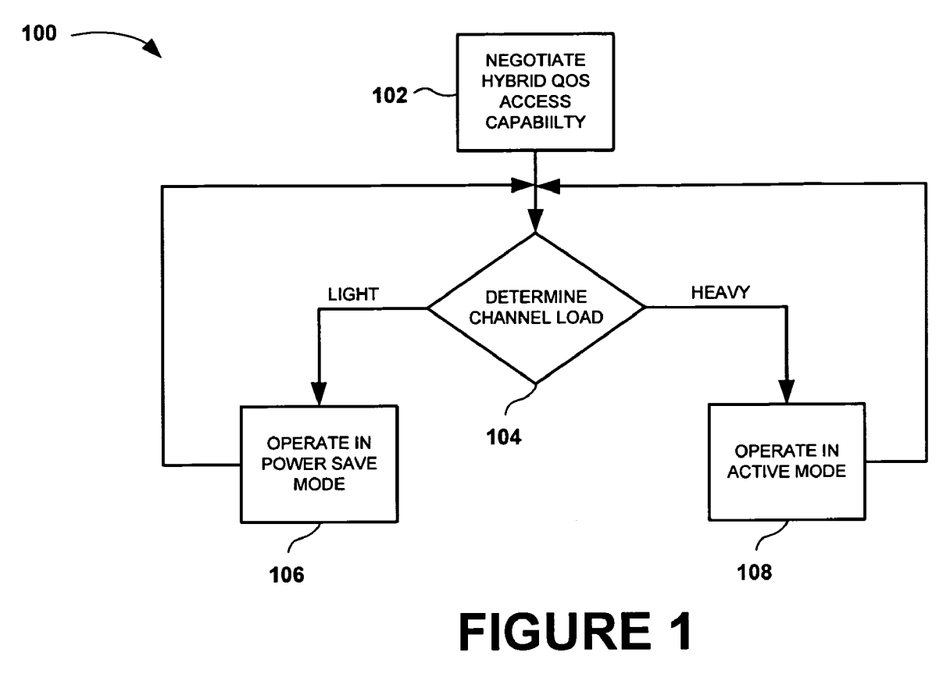
FIG. 1 is a block diagram of a methodology in accordance with an aspect of the present invention.

In view of the foregoing structural and functional features described above, a methodology in accordance with various aspects of the present invention will be better appreciated with reference to FIG. 1. FIG. 1 is a block diagram of a methodology 100 in accordance with an aspect of the present invention. While for purposes of simplicity of explanation, methodology 100 of FIG. 1 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement methodology 100 in accordance with an aspect the present invention. As will be described herein, embodiments of the present invention are suitably adapted to implement methodology 100 in hardware, software, or a combination thereof.

At 102, an AP and an associated station negotiate the hybrid QoS access capability. For example, in FIG. 4, AP 402 and wireless station 406 can negotiate the hybrid QoS access capability during association.

At 104, the channel load is determined. The channel load can be determined by the AP, for example AP 402 of FIG. 4 and/or by the wireless station, for example wireless station 404 of FIG. 4. If the AP determines the channel load, the AP can advertise the channel load in beacons or probe response frames. The wireless station monitors beacon and probe response frames to determine the channel load. Alternatively, the wireless station can independently determine the channel load using any technique known in the art. For example, wireless station 404 can measure transmit delays of frames sent. Another alternative embodiment contemplates that both the AP and the wireless station determine the channel load.

At 106, methodology 100 operates in a power-save mode responsive to the determining the load at 104 determines the load is less than a predetermined threshold (LIGHT). A station (e.g. station 406; FIG. 4) can indicate to an AP (e.g. AP 402; FIG. 4) whether it is operating in a power-save mode or an active mode by setting a flag in an uplink frame. On a light loaded channel, a VoIP power-save station can use EDCA/U-APSD reverse poling to send and receive voice frames. The station wakes up whenever a voice sample is ready for transmission and uses EDCA access to send one or more frames to the AP. The AP can send downlink frames to the station during the unscheduled wakeup period established by the uplink frame.

The AP can use the highest priority HCCA access to send a downlink voice for an admitted stream (e.g. voice stream) to the station, whether the station is operating in power-save mode or in active mode. The AP piggybacks a poll frame on a downlink frame sent to the station. If the station is operating in an active mode, the AP can immediately send downlink data+poll frames to the station as the downlink frames arrive at the AP. A station can immediately respond to a downlink data+oil frame with either an uplink data+ack or an ack frame, without performing a channel access algorithm, mitigating contention for the uplink voice transmissions.

Methodology 100 further contemplates continually determining the channel load. Therefore, whether operating at the power-save mode at 106 or at the active mode at 108, processing again returns to step 104 to determine the channel load and transitions accordingly.

FIG. 2 is a signal diagram 200 for a station operating in power-save mode on a lightly loaded channel. The left side 202 of the diagram represents signals sent and received by the AP (e.g. AP 402; FIG. 4) and the right side 204 represents signals sent and received by a wireless station (e.g. wireless station 406; FIG. 4). When the wireless station has an uplink frame to send to the AP, the wireless station uses the EDCA method. At 206 the station sends an uplink frame (DATA) to the AP after determining the channel is available. At 208, the AP responds with an ACK. The uplink transmission establishes an unscheduled wakeup period for the station.

When the AP has a downlink frame for the wireless station, the AP consistently uses the HCCA method to send the frame. The AP can send the downlink frame in the unscheduled wakeup period established by the previous uplink transmission. At 212, the AP sends a data+poll to the wireless station. The station immediately responds at 214 with an ACK.

At 108, in FIG. 1, methodology 100 operates in an active mode responsive to the determining the load at 104 determines the load is less than a predetermined threshold (HEAVY). If the AP determines and advertises channel load, the AP can set a flag in beacons or probe response frames that will instruct hybrid QoS stations to operate in the active mode. If the wireless station determines channel load, the wireless station may independently transition to an active mode and indicate this transition to the AP by sending an uplink frame with a flag set. Note that the wireless station may independently determine that the channel load is heavy in its area by monitoring delays and collisions incurred for its transmissions even if the overall channel load in the coverage area of the AP is relatively low.

When a wireless station, such as a VoIP wireless station, is operating in an active mode the AP can use HCCA and immediately send downlink frames to the wireless station as soon as the frame arrives at the AP. The AP piggybacks a poll frame on a downlink frame sent to the wireless station. When the wireless station receives the piggybacked poll frame it can respond by sending an uplink data+Ack frame, without performing the channel access algorithm. The downlink transmission by the AP reserves the channel for the uplink transmission by the wireless station. The downlink transmission cannot be "hidden" from other wireless stations in the coverage area of the AP; therefore, the uplink transmission is far less susceptible to collisions with transmissions by hidden node compared to EDCA-based uplink transmissions.

FIG. 3 is a signal diagram 300 for a heavily loaded channel. The left side 302 of signal diagram 300 indicates signals sent and received by the AP and the right side 304 of signal diagram 300 indicates signals sent and received by a wireless station that is operating in active mode. When the AP has a downlink frame for the wireless station, the AP uses the HCCA method to send the frame. HCCA ensures the AP has the highest priority access to the channel. At 306, the AP sends a data+poll to the wireless station. The station immediately responds at 308 with DATA+ACK. Because the AP used HCCA to reserve the channel, the wireless station does not have to contend for the channel, thus saving time and reducing the probability of a collision. At 310 the AP responds with an ACK. However, if the AP has additional data for the station, it can respond with an ACK+data+poll, or if the AP knows the wireless station has additional uplink frames the AP can respond with an ACK+poll.

Ideally, a wireless station operating in an active mode does not contribute to the congestion of a heavily loaded channel by using EDCA access, or any other contention based channel access method initiated by the wireless station, for uplink frames. For a VoIP wires station, if the hybrid QoS method is in effect, the wireless station is guaranteed to receive periodic polls from its parent AP if the wireless station has an active voice call and silence suppression is disabled for the downlink stream when the AP has determined (such as by the wireless station informing the AP it is operating in an active mode or by the AP sending a beacon with a flag set to inform the power-save stations to operate in an active mode). A wireless station can refrain from using EDCA for uplink transmissions if it is guaranteed to receive periodic polls from the AP.

If silence suppression is enabled on a downlink VoIP stream, then an AP cannot guarantee periodic polls, for the respective VoIP station, by simply piggybacking polls on periodic downlink data frames. Nevertheless, the AP can still provide a guaranteed polling service where the AP automatically generates a periodic poll frame when a timer expires. An AP and a wireless station, which have negotiated the hybrid access method, can also negotiate a guaranteed periodic polling service where the AP provides guaranteed periodic polling whenever the channel is heavily loaded.

Figure 7:
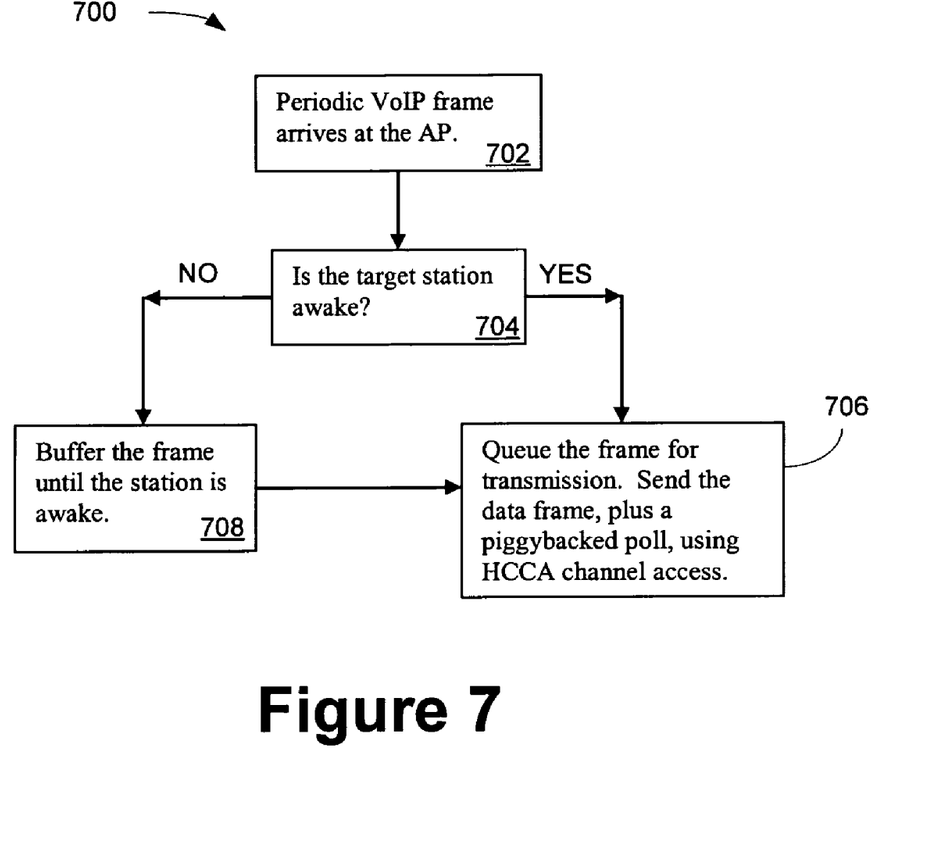
FIG. 7 is a block diagram of a hybrid access method implemented by an is access point.

FIG. 7 illustrates how the hybrid access method can simplify the operation of the AP compared to full 802.11e HCCA AP implementation. The AP always uses HCCA channel access to transmit downlink frames for admitted VoIP streams and the AP always piggybacks a poll frame on each such downlink frame, irrespective of of the power-save state of the target station. The AP simply waits to transmit downlink data frames, with piggybacked polls, to a station, until the station is awake.

An AP employing the hybrid access method uses the method 700 described in FIG. 7 for sending downlink frames. At 702, a periodic VoIP frame arrives at the AP. At 704, the AP determines whether the target station is awake. If the target station is awake (YES), at 704 the AP queues the frame for transmission. The frame is sent with a piggybacked poll using HCCA channel access. If at 704 the AP determines the target station is not awake (NO), at 708 the AP buffers the frame until the station is awake.

Figure 5:
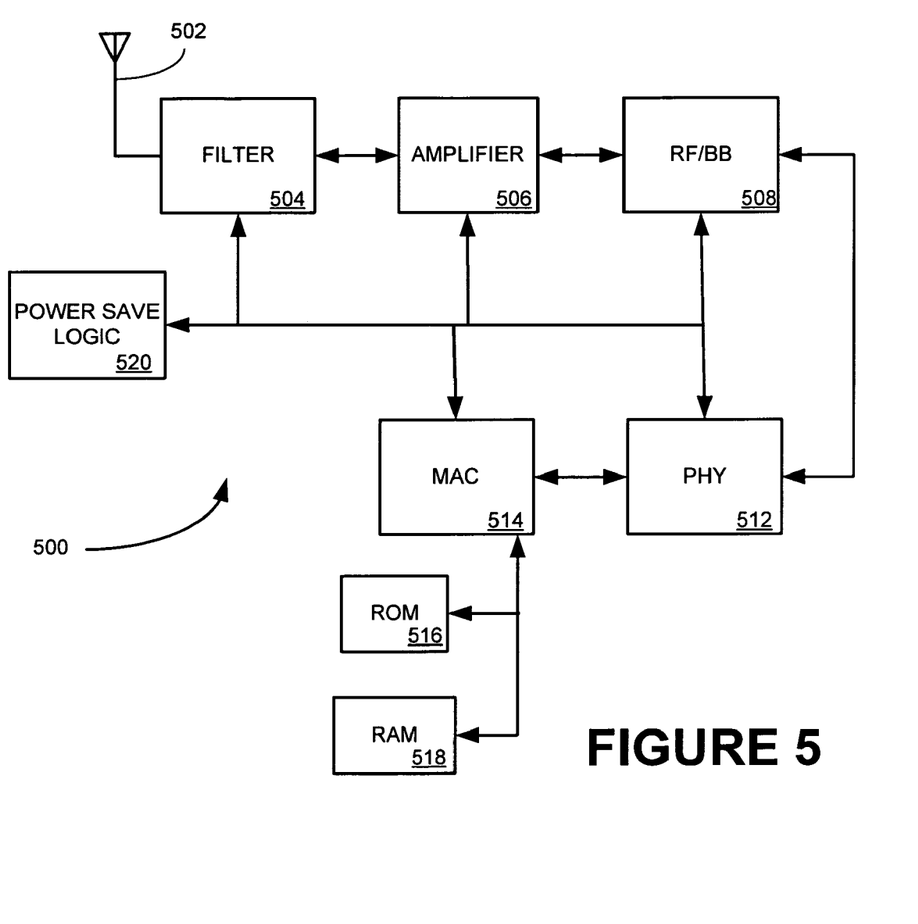
FIG. 5 is a block diagram of a wireless transceiver for implementing an aspect of the present invention.

Referring to FIG. 5, there is illustrated a block diagram of a wireless transceiver 500 upon which an embodiment of the invention may be implemented. Wireless transceiver 500 comprises an antenna 502 for sending and receiving wireless signals. Filter 504 filters signals to/from antenna 502. Preferably, filter 504 is a bandpass filter. Amplifier 506, which can be a low noise amplifier, amplifies signals to/from filter 504. Wireless frequency (e.g. Radio Frequency) to Baseband (RF/BB) converter 508 converts RF signals to/from amplifier 506 and PHY 512. RF/BB converter 508 may suitably comprise additional Intermediate Frequency Stages (e.g., RF/IF and IF/BB). Physical Layer processor (PHY) 512 is coupled to D/AA/D 510. Media Access Controller (MAC) 514 is coupled to PHY 512. Read Only Memory (ROM) 516 and Random Access Memory (RAM) 518 are associated with MAC 514. Transceiver 500 may further comprise additional filters (not shown) e.g. bandpass and/or baseband filters and amplifiers (Not shown), e.g. a Low Noise Amplifier (LNA) or Power Amplifier (PA) as desired; however, these additional filters are not necessary for understanding aspects of the present invention.

PHY 512 is a physical layer (PHY) processing device (e.g., a modem or digital signal processor). PHY 512 typically performs digital signal processing, such as analog-to-digital and digital-to-analog conversion, and encoding/decoding of waveforms (modulation/demodulation). The digital signal processing can be done with general purpose digital signal processing integrated circuits, or in specially designed digital logic. In either case, PHY 512 is modulating/demodulating data to be compatible with the appropriate communication standard. For example, in IEEE 802.11a this involves OFDM, while in IEEE 802.11b it involves Direct Sequence Spread Spectrum (DSSS). On one side of PHY 512, data is exchanged with MAC 514, while on the other side of PHY 512, it is exchanged with RF/BB 508. PHY 512 typically includes analog-to-digital (A/D) converters for data received from RF/BB 508, and digital-to-analog (D/A) converters for data transmitted to RF/BB 508.

MAC 514 is a Medium Access Control (MAC) processing system, In a preferred and/or alternative embodiment the MAC processing system includes a MAC processor (e.g., an embedded processor) which is a multi-functional processor engine responsible for a variety of different processing tasks associated with the wireless communications. RAM 518 is used by MAC 514 to store data going to and from PHY 512. MAC 514 can act upon the data, for example, by encrypting or decrypting it, or by interpreting the data and making decisions as to how and when to forward it.

In operation, signals received by antenna 502 are filtered by filter 504. Amplifier 506 amplifies the signal and RF/BB converter 508 converts the frequency from its wireless (e.g. RF) frequency to a baseband (or other suitable) frequency. The baseband signal is then processed by PHY 512 which may perform one or more of converting the signal from analog to digital, demodulating and decoding. The signal processed by PHY 512 is forwarded to MAC 514 for further processing.

A signal to be transmitted by wireless transceiver 500 is processed by MAC 514. For example MAC 514 may encrypt the signal. The signal may be stored at RAM 518 for future transmission or immediately forwarded to PHY 512. PHY 512 then performs one or more of encoding, modulating, and converting from digital to analog. The signal from PHY 512 is then sent to RF/BB converter 508 which converts the signal to the appropriate wireless frequency. Amplifier 506 amplifies the signal, which is then passed through filter 504 and to antenna 502 for transmission.

Power-save logic 520 determines when operation is in an active mode or in a power-save mode. Furthermore, power-save logic 520 can transition one or more of filter 504, amplifier 506, RF/BB 508, PHY 512 and MAC 514 from a normal operating state to a low power state and from a lower power state to an active state. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In accordance with an aspect of the present invention, wireless transceiver 500 implements aspects of the methodology described herein. If wireless transceiver 500 is employed for an AP, power-save logic 520 can further comprise logic and/or a table for determining the power-save states of associated wireless stations. Thus, when the AP receives downlink frames for a wireless station, it can determine whether the station is in an active or power-save state. If the station is in an active state the downlink frame can be sent immediately. If the station is in a power-save state, the frame can be stored in RAM 518 until the wireless transceiver determines the wireless station has transitioned to an active state.

If wireless transceiver 500 is employed for a wireless station, then power-save logic 520 is configured to determine a load for a channel the wireless transceiver is operating. Power-save logic 520 is responsive to operating wireless transceiver 500 in a power-save mode responsive to determining the load is less than a predetermined threshold. For operating in the power-save state, power-save logic 520 transitions one or more of filter 504, amplifier 506, RF/BB 508, PHY 512 and MAC 514 from a normal operating state to a low power state. Power-save logic 520 is responsive to operating the wireless transceiver in an active mode responsive to determining the load is greater than the predetermined threshold. For operating in the active mode, power-save logic 520 transitions one or more of filter 504, amplifier 506, RF/BB 508, PHY 512 and MAC 514 from a low power state to a normal operating state.

In accordance with an aspect of the present invention, power-save logic 520 comprises logic for negotiating hybrid Quality of Service access capability. In a preferred embodiment, power-save logic 520 is configured to determine channel load by monitoring channel load information advertised by an access point via the wireless transceiver. The load information can be advertised by the access point in a beacon frame or a probe response frame. In an alternative preferred embodiment, power-save logic 520 determines load information by measuring transmits delays of frames.

Figure 6:
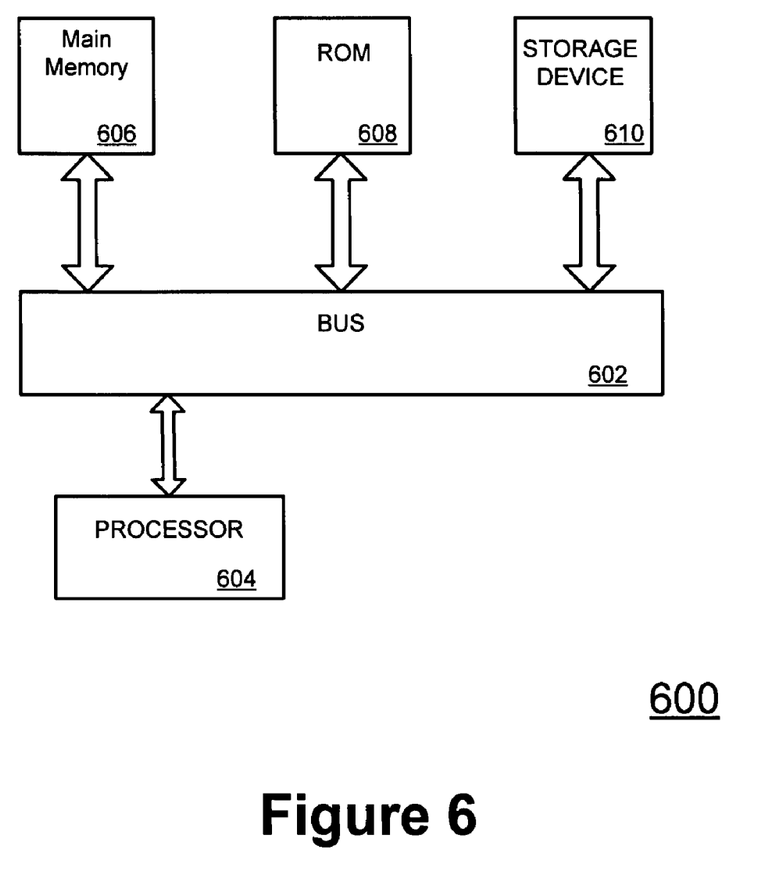
FIG. 6 is a block diagram of a computer system for implementing an aspect of the present invention.

FIG. 6 is a block diagram that illustrates a computer system 600 upon which an embodiment of the invention may be implemented. For example, computer system 600 can be used to implement power-save logic 520 (FIG. 5). Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

The invention is related to the use of computer system 600 for implementing a hybrid QoS access method for power-save stations. According to one embodiment of the invention, implementing a hybrid QoS access method for power-save stations is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to non-volatile media, volatile media, and transmission media. Non-volatile media include for example optical or magnetic disks, such as storage device 610. Volatile media include dynamic memory such as main memory 606. Transmission media include coaxial cables, copper wire and fiber optics, including the wires that comprise bus 602. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A hybrid access method, comprising:
   determining a load for a wireless channel;
   operating a wireless transceiver in a first mode while the load is less than a predetermined threshold, wherein while operating in the first mode, the wireless transceiver alternates between a power save state and an active state, and upon exiting the power save state and entering the active state, the wireless transceiver employs a first channel access protocol for sending a first uplink frame;
   operating the wireless transceiver in a second mode while the load is greater than the predetermined threshold, wherein while operating in the second mode the wireless transceiver remains in the active state and does not enter the power save state, wherein the wireless transceiver employs a second channel access protocol for sending a second uplink frame; and
   sending a reverse poll to an access point to solicit a downlink frame while operating in the first mode;
   wherein the first channel access protocol is a contention based protocol wherein the first uplink frame is sent after waiting for a predetermined time; and
   wherein the second channel access is a contention controlled protocol wherein the second uplink frame is sent responsive to receiving a downlink poll;

wherein at least one uplink frame sent in the first mode is an isochronous voice frame; and wherein at least one uplink frame sent in the second mode is an isochronous voice frame.

2. A method according to claim 1, further comprising negotiating hybrid Quality of Service access capability.

3. A method according to claim 1, the determining channel load further comprises monitoring channel load information advertised by an access point.

4. A method according to claim 3, wherein the load information is advertised by the access point by one of the group consisting of a beacon frame and a probe response frame.

5. A method according to claim 4, wherein the load information advertised by the access point instructs all stations that are using the hybrid access method, to operate in active mode, when the channel load exceeds some predetermined threshold.

6. A method according to claim 1, wherein a station independently determines the channel load, by monitoring one of the group consisting of the collision rate and the access delay, for frames sent by the station and wherein the station independently transitions to active mode if the channel load exceeds some threshold value.

7. A method according to claim 1, wherein channel access during the first mode is obtained by a selected one of a group of Enhanced Distributed Channel Access, Unscheduled Advanced Power-Save Delivery, and reverse polling.

8. An apparatus, comprising:

a wireless transceiver; and power-save logic operatively coupled to the wireless transceiver;

wherein the power-save logic is configured to determine a load for a channel the wireless transceiver is operating;

wherein the power-save logic is responsive to operating the wireless transceiver in a first mode while the load is less than a predetermined threshold;

wherein the power-save logic is responsive to operating the wireless transceiver in a second mode while the load is greater than the predetermined threshold;

wherein while operating in the first mode, the power save logic is configured to switch the wireless transceiver between a power-save mode and an active mode;

wherein while operating in the first mode, the power save logic after switching the wireless transceiver from the power save mode to the active mode is further configured to send a first uplink frame via the wireless transceiver, wherein the power save logic employs contention based channel access to send the first uplink frame via the wireless transceiver;

wherein the power save logic maintains the wireless transceiver exclusively in an active mode and does not transition the wireless transceiver to a power save state while operating in the second mode;

wherein while operating in the second mode, the power save logic waits for a poll before sending a second uplink frame;

wherein the power save logic is responsive to receiving the poll to transmit the second uplink frame; and wherein the power save logic sends a reverse poll to an access point to solicit a downlink frame while operating in the first mode;

wherein at least one uplink frame sent in the first mode is an isochronous voice frame; and wherein at least one uplink frame sent in the second mode is an isochronous voice frame.

9. An apparatus according to claim 8, the power-save logic further comprising logic for negotiating hybrid Quality of Service access capability.

10. An apparatus according to claim 8, the power-save logic is configured to determine channel load by monitoring channel load information advertised by an access point via the wireless transceiver.

11. An apparatus according to claim 10, wherein the load information is advertised by the access point in a beacon frame.

12. An apparatus according to claim 10, wherein the load information is advertised by the access point in a probe response frame.

13. An apparatus according to claim 8, wherein the power-save logic determines load information by measuring transmits delays of frames.

14. Logic encoded in a non-transitory computer readable medium for execution by a processor, and when executed operable to:

determine a load for a wireless channel;

operate a wireless transceiver in a first mode while the load is less than a predetermined threshold, wherein while operating in the first mode, the wireless transceiver alternates between a power save state and an active state, and upon exiting the power save state and entering the active state, the wireless transceiver employs a first channel access protocol for sending a first uplink frame;

operate the wireless transceiver in a second mode while the load is greater than the predetermined threshold, wherein while operating in the second mode the wireless transceiver remains in the active state and does not enter the power save state, wherein the wireless transceiver employs a second channel access protocol for sending a second uplink frame; and send a reverse poll to an access point to solicit a downlink frame while operating in the first mode;

wherein the first channel access protocol is a contention based protocol, wherein the first uplink frame is sent after waiting for a predetermined time; and wherein the second channel access is a contention controlled protocol, wherein the second uplink frame is sent responsive to receiving a downlink poll;

wherein at least one uplink frame sent in the first mode is an isochronous voice frame; and wherein at least one uplink frame sent in the second mode is an isochronous voice frame.

* * * * *